United States Patent
Wachowiak, Jr.

[11] Patent Number: 6,156,108
[45] Date of Patent: Dec. 5, 2000

[54] EMULSION-CONTAINING SURFACE POLISHES

[75] Inventor: Melvin Joseph Wachowiak, Jr., Davidsonville, Md.

[73] Assignee: The Smithsonian Institution, Washington, D.C.

[21] Appl. No.: 09/219,444

[22] Filed: Dec. 23, 1998

[51] Int. Cl.$^7$ .............. C08D 3/07; C08L 23/00; C09G 1/10; C09G 1/04

[52] U.S. Cl. .............. 106/10; 106/11; 106/271; 106/272

[58] Field of Search ................ 106/10, 11, 271, 106/272

[56] References Cited

U.S. PATENT DOCUMENTS

| | | | |
|---|---|---|---|
| 3,393,078 | 7/1968 | Lockhart et al. | 106/11 |
| 4,046,726 | 9/1977 | Meiner et al. | 260/27 R |
| 4,163,673 | 8/1979 | Dechert | 106/6 |
| 4,239,546 | 12/1980 | Russell et al. | 106/270 |
| 4,330,571 | 5/1982 | Stovall et al. | 427/120 |
| 4,354,871 | 10/1982 | Sutton | 106/3 |
| 4,426,229 | 1/1984 | Bolton et al. | 106/270 |
| 4,432,797 | 2/1984 | Vasishth et al. | 106/34 |
| 4,468,254 | 8/1984 | Yokoyama et al. | 106/271 |
| 4,732,612 | 3/1988 | Steer et al. | 106/10 |
| 4,748,196 | 5/1988 | Kuroda et al. | 524/43 |
| 4,766,166 | 8/1988 | Upadhyaya et al. | 524/275 |
| 4,810,407 | 3/1989 | Sandvick | 252/70 |
| 4,898,751 | 2/1990 | Dwivedy | 427/230 |
| 4,942,193 | 7/1990 | Van Buskirk et al. | 524/276 |
| 5,028,265 | 7/1991 | Schmidt-Thuemmes et al. | 106/271 |
| 5,049,186 | 9/1991 | Kawabata | 106/2 |
| 5,085,695 | 2/1992 | Randen et al. | 106/8 |
| 5,229,450 | 7/1993 | Van Buskirk et al. | 524/407 |
| 5,338,345 | 8/1994 | Scarborough et al. | 106/2 |
| 5,348,998 | 9/1994 | Ito et al. | 524/190 |
| 5,431,840 | 7/1995 | Soldanski et al. | 252/174.17 |
| 5,445,670 | 8/1995 | Each et al. | 106/3 |
| 5,501,724 | 3/1996 | Loff | 106/10 |
| 5,556,450 | 9/1996 | Skodell et al. | 106/10 |

*Primary Examiner*—C. Melissa Koslow
*Attorney, Agent, or Firm*—Rothwell, Figg, Ernst & Manbeck

[57] ABSTRACT

Water in oil emulsion formulations comprise:
a) from about 55% to about 65% by weight of the formulation of an aliphatic hydrocarbon solvent comprising a maximum of 10% aromatic hydrocarbons;
b) from about 15% to about 25% by weight of a wax product which is emulsifiable, possesses a polar component and has a melting/softening point in the range of from 60° C. to about 90° C.;
c) from about 1% to about 5% by weight of an emulsifier;
d) from 0 to about 0.5% by weight of a resin; and
e) about 13% to about 18% by weight water, with the proviso that the combination of solvent and wax products comprises at least about 75% of the total composition. The formulations are useful as surface polishes that can be used on any hard surface including wood, metal, stone, and other non-porous surfaces.

26 Claims, No Drawings

EMULSION-CONTAINING SURFACE POLISHES

TECHNICAL FIELD

This invention relates to protective and decorative polish formulations which when applied to various surfaces protect and polish the surfaces without causing any detrimental effects. The polish formulations contain materials with long-term chemical stability that provide consistent high quality which is particularly important for preserving and refinishing antiques and historic objects.

BACKGROUND OF THE INVENTION

Wax- and silicone-containing polishes used for protective and decorative purposes are well-known in the art. They provide shine to furniture, floors, and other surfaces by leaving a glossy coating on the surface. Such polishes contain ingredients that can protect surfaces from tarnish and weather, remove old coatings, clean, and/or smooth rough surfaces. However, many polish ingredients are detrimental to certain surfaces, especially fragile surfaces found on antiques, for example, and also can be detrimental to the user's health.

Often, the glossy coating on a polished surface is caused by buffing a surface with a wax-containing polish. Examples of commonly used waxes include paraffin wax, carnauba wax, microcrystalline petroleum wax, vegetable wax, animal wax, and oxidized polyethylene and other synthetic polymeric waxes. Although useful, these existing wax formulations often fail to provide the desired ease of emulsification. In addition, these commonly used waxes frequently do not have the desired dual characteristics of malleability and durability.

If the glossy coating is not caused by a wax film, then it may be due to a silicone film created using dimethyl silicones or amino functional silicone products often found in polish formulations. The advantage of silicone is its ease of application. Silicone, however, also can contaminate surfaces and may be difficult to remove, especially amino functional silicones which crosslink and bond to the surface being polished.

Also often present in existing commercially available polish formulations is a strong alkaline emulsifier. Such emulsifiers may be desirable to aid in emulsifying the wax silicone component of the formulation, but they also can be damaging to the surface to which the formulation is applied.

Most known commercial polishes lack long-term stability and contain unspecified and variable ingredients or undesirable resins and modifiers, thus providing inconsistent quality. Such variables can be detrimental to objects, especially museum-quality artifacts and fragile antiques. For example, solvents in commercially available polishes generally have a high aromatic content which can be toxic and potentially damaging to the object being polished. Moreover, such variables can create application problems. Commercial polishes that are difficult to apply result in an unsatisfactory appearance of the polished surface.

OBJECTS OF THE INVENTION

It is therefore an object of the present invention to overcome the disadvantages of known polishes by providing superior surface polishes that are safe and easy to use by professional finishers, cabinetmakers, collectors, and individual consumers. It is a further object of the invention to provide polishes which are water-based to control volatility and which comprise an organic solvent having little to virtually no aromatic content, so that the health risks associated with the use of the polishes are low and the polishes can be used on almost any hard surface without harm. The polishes of the present invention combine low toxicity, ease of application, long term stability, and consideration of the fragile nature of cultural artifacts.

SUMMARY OF THE INVENTION

In accordance with the present invention, polish formulations are provided which comprise water in oil emulsions which comprise:

a) about 55% to about 65% by weight of the formulation of an aliphatic hydrocarbon solvent comprising a maximum of 10% aromatic hydrocarbons;

b) about 15% to about 25% by weight of a wax product which is emulsifiable and has a melting/softening point in the range of from 60° C. to about 90° C.;

c) about 1% to about 5% by weight of an emulsifier;

d) about 0% to about 0.5% resin; and e) about 13% to about 18% by weight water, with the proviso that the combination of solvent and wax product comprises at least 75% of the total composition. Preferably the combination of solvent and wax product comprises at least 80% by weight of the total.

The wax product can comprise a single wax or a mixture of waxes and is selected to be durable and malleable. Modifiers such as colorants, abrasives, preservatives, slip-reducing agents, and ultraviolet light inhibitors also can be included in the formulations.

The formulations are useful for polishing antiques and other fragile surfaces including wood, metal, stone, ceramic, varnished, painted, plastic and other non-porous surfaces. They also can be used to fill dents and cover scratches. The formulations are water-based to control volatility and contain ingredients of low toxicity, known long-term chemical stability, and high purity, e.g. pharmaceutical or food grade. Additionally, the organic solvent in the formulations has very little or no aromatic content and the formulations do not contain silicone which can be detrimental to the preservation of historic objects. Another important feature of the formulations is that stable emulsification is accomplished without the use of a strong acidic or basic component. The resulting emulsion form helps inhibit even mild solvent evaporation, thereby resulting in a safer work environment. Thus, the formulations can be used by consumers and professional conservators alike on any stable surface, including furniture, statuary, floors, walls, and ceilings, that is not sensitive to the solvent in the formulations. On unfinished or degraded surfaces, the formulations can be used as a finishing wax. In such cases, a wax polish without emulsifiers should be used as the preparatory coat.

DETAILED DESCRIPTION OF THE INVENTION

The novel polish formulations are emulsions that function as a surface polish for polishing and preserving hard, stable surfaces such as wood, stone, metal, varnished, ceramic, and painted surfaces. Applying the formulation is simple. The ingredients allow for easy, thin application (essential to a successful polish) so that the surface can be buffed readily by hand or machine. Left unbuffed, the polish becomes a matting agent. In addition, the polish is readily removable using mineral spirits and can be reapplied without having to remove the entire original coating.

The polish comprises a water-in-oil emulsion, that is, an emulsion in which the minor component is water and the major component is a combination of an aliphatic hydrocarbon solvent and a wax product. The ratio of water to the combination of solvent and wax product is about 1:4 to about 1:6.5. In addition to the water, solvent and wax product, the formulation comprises a linear emulsifier and, preferably, an acrylic resin. In one preferred embodiment, the formulation comprises Stoddard solvent, polycyclohexanone resin, sorbitan trioleate/polyoxyethylene (20) trioleate in a 1.5:1 ratio, beeswax, shellac wax, and deionized water.

Solvents useful in the formulations of this invention are predominately aliphatic hydrocarbon solvents, i.e., solvents containing from 100% to about 90% aliphatic hydrocarbons and 0 to about 10% aromatic hydrocarbons. Suitable solvents with a less than 10% aromatic content include Stoddard solvent, odorless mineral spirits, California Rule 66 solvent and mixed alkanes that have a flash point of about 40° C. The preferred aromatic content is less than about 1%. The solvent concentration can vary from about 55% to about 65%, and is preferably within the range of about 60% to about 65% by weight of the final formulation. A preferred solvent is Stoddard solvent.

In addition to water, an emulsifier, a resin and a solvent, the formulations comprise a wax product that is thermoplastic, plastic and durable, and has a polar component and a melting/softening point of from 60° C. to 90° C. As used herein, "thermoplastic" means a product that will remain soluble in a desired class of solvent and will not become cross-linked or insoluble over time, "durable" means that it retains its physical properties over time; and "plastic" means it is pliable, non-glassy and fracture resistant. The wax product can be a single wax or can comprise a mixture of waxes blended together to form a product having the desired characteristics. The wax product desirably is a combination of a relatively hard, more durable wax and a relatively soft, more malleable wax. As used herein, a "hard" wax is a wax that is relatively more plastic at room temperature, tough, relatively more fracture resistant, and has a melting temperature of about 70°–90° C. A "soft" wax is relatively more flexible, can be sticky at room temperature and has a melting temperature of about 60°–70° C. A preferred wax product is a combination of shellac wax and beeswax. A desirable weight:weight ratio of shellac wax to beeswax is from about 1:3 to about 1:6; the concentration of the wax product desirably is about 15% to about 25% by weight of the total formulation. A preferred weight:weight ratio of shellac wax to beeswax is about 1:5; a preferred concentration of shellac wax is about 3.33% by total weight of the formulation, and a preferred concentration of beeswax is about 16% by weight of the formulation. Substitutes for shellac wax include other hard, durable waxes such as carnauba wax, hard ozokerite, ceresin and synthetic polyethylene waxes. Substitutes for beeswax include other soft, malleable waxes such as modified paraffin, emulsifiable synthetics, sugar cane wax and commercial mixtures, such as Ross Beeswax substitute 628/5, a vegetable and hydrocarbon wax mixture.

The wax product can comprise synthetic waxes instead of, or in addition to, the natural wax(es). When using synthetic waxes, at least two waxes typically must be combined to obtain a wax product with the desired characteristics of emulsifiability, malleability, durability, and solidity at room temperature and a melting/softening point in the range of from 60° C. to 90° C. Synthetic waxes can extend performance and provide effective substitutes when natural waxes are scarce, and are inexpensive. In addition, such waxes are ideal for protecting metal surfaces such as bronze because natural waxes are slightly acidic and can promote corrosion.

In accordance with the present invention, the combination of the wax or combination of waxes and the selected solvent in the final composition comprise at least about 75% of the total composition. Preferably the combination of solvent and wax product comprises at least 80% by weight of the total.

Surfactants, such as emulsifiers, are characterized by their hydrophile-lipophile balance (HLB) number. The functionality of the surfactant can be determined by the balance between its hydrophilic and lipophilic proportions. Once a general requirement for stable emulsification has been met, the surfactant or surfactant blend HLB number or range is set. The HLB range for a water-in-oil emulsion is generally 3–8. The minor phase of the emulsion is water; the major phase is oil, specifically an aliphatic hydrocarbon solvent and waxes. The emulsifier in the most preferred variation of the polish formulations has an HLB number of 5. An HLB number in the 3–8 range can be obtained using a single emulsifier or a combination of emulsifiers to create a stable emulsion. The presence of two or more emulsifiers can be advantageous in increasing the stability of the emulsion.

The polish formulations contain a linear emulsifier which is compatible in the predominantly aliphatic hydrocarbon-wax mixture phase. Suitable emulsifiers include sorbitan polyoxyethylene (20) beeswax derivative (Atlas G1726, ICI Americas, Inc.) and sorbitan sesquioleate (Arlacel 83, ICI Americas, Inc.). A preferred emulsifier is sorbitan trioleate (Span 85, ICI Americas, Inc.) and polyoxyethylene (20) trioleate (Tween 85, ICI Americas, Inc.) in a 1.5:1 ratio. The amount of emulsifier can vary, but it is desirable to use the least amount necessary to create and maintain a stable emulsion. The concentration of emulsifiers typically ranges from about 1% to about 5% by weight of the total formulation. The preferred concentration is about 2% to about 3%.

The resin provides hardness and anti-slip quality to the polish formulation. Suitable resins include poly-alphamethyl styrene, polyvinyl alcohol, poly-isobutyl methacrylate and polybutyl acrylate. A preferred resin is polycyclohexanone resin due to its hardness. The concentration of the resin can vary from about 0% to about 0.5% by weight of the total formulation. A preferred concentration range is from about 0.1% to about 0.5%. Depending upon the desired character of the formulation, however, the resin can be omitted from the formulation or its concentration increased beyond the recommendations given above to a maximum of about 10%. An increase in resin concentration changes the character of the formulation so that it resembles paint or varnish as opposed to a liquid spray. High resin concentrations are usful when a tougher, more water-proof film is desired. Elminating or reducing the resin results in a softer, more matte film which will be subject to more dust pick up.

Optional ingredients in the polish formulations include colorants. Colorants are color additives that combine the light-fastness of traditional inorganic pigments with the transparency of organic dyes. Exemplary colorants include pigments with a particle size of less than about 0.5 microns, such as Microlith pigments from Ciba. Preferably, the colorant is present at a concentration of less than about 4%, but the concentration will vary depending upon the intended application of the formulation. As colorants can inhibit emulsion formation or lessen the stability of the emulsion, it may be desirable to add excess emulsifier if a colorant is used or use the pigment in an acrylic emulsion or use pigments surface-treated for emulsification.

Color is only one possible modifier. Other modifiers which can be added depending upon the intended use of the formulation include ultraviolet light absorbers, abrasives, preservatives, and slip-reducing agents such as modified rosin. A formulation containing rosin would be ideal for polishing floors. Abrasives such as chalks, silicates, silicas rottenstone, pumice, aluminum oxides, tripoli, calcium carbonates, diatomaceous earth and silicon carbides can be added so that the formulation functions as a delivery vehicle for the abrasives. Abrasives are selected based on intended effect, i.e., smoothing a rough surface or cleaning a surface, and on the nature of the surface to which the formulation is applied. For example, certain abrasives, such as silicon carbide, are suitable for use on some metals and others, such as alumina, are suitable for use on some stone. The disadvantage to adding an abrasive is the erosion of the emulsion. Erosion can be minimized or avoided by increasing the emulsifier concentration to stabilize the emulsion. Materials which improve polish storage capability and performance, such as preservatives, also can be added. Suitable preservatives include zinc oxide, methyl-, propyl-, and butyl-paraben and proprietary preservatives for water and oil systems.

Suitable ultraviolet light absorbers include zinc oxide, benzotriazoles and benzo-phenones and typically comprise about 1% to about 3% by weight of the total formulation.

The formulations can be thinned or thickened by varying the solid, i.e., wax product, concentration. For example, a high gloss can be obtained when the solid concentration is low whereas a matte finish can result when the solid concentration is high. Similarly, a decrease in solid concentration results in a less viscous solution whereas an increase in solid concentration results in a thicker solution. Finally, delivery methods can be determined by the solids concentration. The formulation is sprayable in the absence of a high solids concentration and becomes paste-like when the solids concentration increases. Although solids concentration can vary, the ratio of wax to solvent desirably is within the range of about 1:2 to about 1:5 and the ratio of water to wax and solvent desirably is within the range of about 1:4 to about 1:6.5.

One advantage of the polish formulations is the flexibility of ingredients and ingredient concentrations as illustrated above. One skilled in the art can create a wide variety of polishes depending upon the intended use of the polish, the surface of the object, and the look that the skilled artisan desires.

A preferred method of making the formulations includes the following steps:
(a) heating an aliphatic hydrocarbon solvent which comprises from 0 to about 10% aromatic hydrocarbons;
(b) adding a resin to the heated solvent if desired;
(c) melting the resultant solvent/resin combination from step (b);
(d) heating a wax or combination of waxes to melting;
(e) combining the wax(es) with the solvent/resin mixture of step (c);
(f) adding an emulsifier to the mixture of step (e);
(g) adding water while agitating the mixture of step (f);
(h) heating the combination obtained from step (g) to pour point, approximately 45° C.; and
(i) transferring the mixture from step (h) into containers.

When additional components, such as an ultraviolet light absorber, preservative, abrasive or colorant, are to be included in the final formulation, they typically are added to the solvent mixture if they are not heat sensitive or volatile (e.g., inorganic pigments, zinc oxide) or to the emulsified mixture, just prior to reaching the pour point, if they are heat sensitive (e.g., preservatives).

The invention is shown by the following examples, which are provided for illustrative purposes only and are not to be construed as limiting the scope of the invention.

EXAMPLES

Example 1

Paste Polish Formulation
  Ingredients:
  95 g Stoddard Solvent
  0.2 g polycyclohexanone resin
  24 g beeswax
  5 g shellac wax
  2 g emulsifier (sorbitan trioleate (Span 85) and polyoxyethylene (20) trioleate (Tween 85) in a 1.5:1 ratio)
  24 g distilled water The formulation was made by heating the solvent to approximately 30° C. in a stainless steel container and then adding to the heated solvent powdered polycyclohexanone resin. The mixture was agitated using a magnetic stirrer for about 10 minutes to speed the incorporation of the resin into the solvent.

The shellac wax was melted at about 80° C. in a stainless steel container in a water bath, then the beeswax was added to the melted shellac wax and the mixture was stirred until the beeswax had melted. The melted wax mixture was added to, and mixed with, the solvent and resin mixture, then the emulsifier was added to the mixture.

The water was added in a thin stream while agitating the mixture for 5 minutes; the resultant mixture then was cooled to the pour point (25–30° C.) and transferred to a jar with a screw-on lid.

The resultant product has a buttery texture and can be buffed out by hand.

Example 2

Liquid Polish
  Ingredients:
  100 g Stoddard solvent
  24 g beeswax
  5 g shellac wax
  2 g emulsifier (Span 85/Tween 85; sorbitan trioleate/polyoxyethylene (20) sorbitan trioleate; 60/40 ratio)
  24 g distilled water The solvent was heated to 30° C. (and held at this temperature while the waxes were melted). The shellac wax was heated to about 80° C. in a stainless steel container in a water bath, then the beeswax was added to the melted shellac wax and the mixture was stirred until the beeswax had liquified.

The solvent was added to, and mixed with, the melted wax mixture, then the emulsifer was added to the mixture.

The water was added while agitating the mixture; the resultant mixture then was cooled to the pour point (25–30° C.) and transferred to a jar with a screw-on lid.

The resultant formulation is a low viscosity fluid polish that can be delivered by pump or squeeze bottle.

Example 3

Tinted Paste Polish
  Ingredients:
  95 g Stoddard solvent
  0.2 g polycyclohexanone resin
  24 g beeswax
  5 g shellac wax 2 g emulsifier (sorbitan trioleate and polyoxyethylene (20) trioleate) (60:40 ratio)

23 g distilled water 1 g color concentrate (described below)

The color concentrate used was prepared from Ciba Microlith WA, a pigment-carrier solvent mixture. 40 parts of water and 15 parts alcohol were combined and mixed at 1000 rpm. During this mixing 25 parts of Microlith WA pigment preparation was added and the mixing was continued for one minute. 2 parts of ammonia were stirred in, the mixing speed was raised to 3000 rpm and mixing was continued for 15 minutes. An additional 13 parts of water and 5 parts of alcohol were added and mixing was continued for 5 minutes.

The solvent was heated to approximately 30° C. in a stainless steel container in a water bath and the powdered resin was added. The solvent and resin were agitated with a magnetic stirrer for 10 minutes to speed the incorporation of the resin into the solvent. The 30° temp was maintained during this process.

The shellac wax was heated to about 80° C. in a stainless steel container in a water bath, then the beeswax was added to the melted shellac wax and the mixture was stirred until the beeswax had liquified The solvent and resin mixture was added to, and mixed with, the melted wax mixture, then the emulsifier was added to the mixture.

The colorant was dispersed in the water, then the water was added in a thin stream to the solvent mixture while agitating the mixture for 5 minutes; the resultant mixture then was cooled to the pour point (25–30° C.) and transferred to a jar with a screw-on lid.

The resultant formulation has a buttery texture and can be buffed out by hand. It is lightly tinted, which can add a subtle tone to a surface, cover scratches and help restore light-faded areas.

What is claimed is:

1. A water in oil emulsion formulation which comprises:
   a) from about 55% to about 65% by weight of the formulation of an aliphatic hydrocarbon solvent comprising a maximum of about 10% aromatic hydrocarbons;
   b) from about 15% to about 25% by weight of a wax product which is emulsifiable and has a melting/softening point in the range of from 60° C. to about 90° C.;
   c) from about 1% to about 5% by weight of an emulsifier;
   d) from 0 to about 0.5% by weight of a resin; and
   e) about 13% to about 18% by weight water, with the proviso that the combination of solvent and wax product comprises at least about 75% of the total composition and with the further proviso that the composition does not comprise silicon.

2. The formulation of claim 1 wherein the aliphatic hydrocarbon solvent is selected from the group consisting of Stoddard solvent, odorless mineral spirits, California Rule 66 solvent and mixed alkanes having a flash point of about 40° C.

3. The formulation of claim 1, wherein the wax product comprises a mixture of two different waxes.

4. The formulation of claim 3, wherein the wax product comprises a mixture of a first wax selected from the group consisting of shellac wax, carnauba wax, hard ozokerite, ceresin, and a synthetic polyethylene wax and a second wax selected from the group consisting of beeswax, modified paraffin, sugar cane wax, vegetable and hydrocarbon wax mixtures and emulsifiable synthetic waxes.

5. The formulation of claim 4, wherein the wax product comprises a mixture of shellac wax and beeswax.

6. The formulation of claim 5, wherein the wt:wt ratio of shellac wax to beeswax is about 1:3 to about 1:6.

7. The formulation of claim 1, wherein the emulsifier is selected from the group consisting of (a) polyoxyethylene (20) sorbitol beeswax derivative, (b) sorbitan trioleate and polyoxyethylene (20) trioleate in a 1.5:1 ratio, and (c) sorbitan sesquioleate.

8. The formulation of claim 1, wherein the resin is selected from the group consisting of polycyclohexanone resin, poly-alphamethyl styrene, polyvinyl alcohol, polyisobutyl methacrylate and polybutyl methacrylate.

9. A water in oil emulsion formulation which comprises:
   a) from about 60% to about 65% by weight of the formulation of an aliphatic hydrocarbon solvent comprising a maximum of 10% aromatic hydrocarbons;
   b) from about 15% to about 25% by weight of a wax product which is emulsifiable, and has a melting/softening point in the range of from 65° C. to about 85° C.;
   c) from about 1% to about 2% by weight of an emulsifier;
   d) from about 0.1% to about 0.3% by weight of a resin; and
   e) about 13% to about 18% by weight water.

10. A water in oil emulsion formulation which comprises:
    a) from about 60% to about 65% by weight of the formulation of Stoddard solvent;
    b) from about 15% to about 25% by weight of a mixture of shellac wax and beeswax, said shellac wax and beeswax combined to produce a wax mixture which is emulsifiable and has a melting/softening point in the range of from 65° C. to about 85° C.;
    c) from about 1% to about 2% by weight of sorbitan trioleate in a 1.5:1 ratio and polyoxyethylene (20) trioleate;
    d) from about 0.1% to about 0.3% by weight of polycyclohexanone resin; and
    e) about 13% to about 18% by weight water.

11. The formulation of claim 1, 9, or 10, which further comprises an additive selected from the group consisting of a colorant, a slip-reducing agent, an abrasive, a preservative, and an ultraviolet light absorber.

12. The formulation of claim 11, wherein the slip-reducing agent is modified rosin.

13. The formulation of claim 11, wherein the abrasive is selected from the group consisting of silicates, rottenstone (tripoli), pumice, aluminum oxides, silicas, calcium carbonate (chalk), diatomaceous earth and silicon carbide.

14. The formulation of claim 11, wherein the ultraviolet light absorber is selected from the group consisting of zinc oxide, benzotriazoles and benzophenones.

15. The formulation of claim 11, wherein the colorant comprises a transparent pigment having a maximum particle size of about 0.5 µm.

16. A method of making a water in oil emulsion formulation which comprises:
    (a) heating an aliphatic hydrocarbon solvent which comprises a maximum of about 10% aromatic hydrocarbons;
    (b) adding a resin to the heated aliphatic hydrocarbon solvent;
    (c) melting the resultant mixture from step (b);
    (d) melting a wax product which is emulsifiable, has a polar component and has a melting/softening point of from about 60° C. to about 90° C.;

(e) combining the melted aliphatic hydrocarbon solvent/resin mixture with the melted wax product;

(f) adding an emulsifier to the resultant mixture from step (e);

(g) adding water while agitating the mixture from step (f); and (h) heating the combination obtained from step (g) until the temperature reaches the pour point; p1 wherein the resultant product comprises about 55% to about 65% by weight solvent, about 15% to about 25% wax product, about 1% to about 5% emulsifier, about 0 to about 0.5% resin and about 13% to about 18% water and the combination of solvent and wax product comprise at least about 75% of the total composition.

17. The method of claim 16, wherein the aliphatic hydrocarbon solvent is selected from the group consisting of Stoddard solvent, odorless mineral spirits, California Rule 66 solvent and mixed alkanes having a flash point of about 40° C.

18. The method of claim 16, wherein the wax product comprises a mixture of a first wax selected from the group consisting of shellac wax, carnauba wax and a synthetic polyethylene wax and a second wax selected from the group consisting of beeswax, emulsifiable synthetic waxes, modified paraffin and vegetable and hydrocarbon wax mixtures.

19. The method of claim 18, wherein the wax product comprises a mixture of shellac wax and beeswax.

20. The method of claim 19, wherein the wt:wt ratio of shellac wax to beeswax is about 1:3 to about 1:6.

21. The method of claim 16, wherein the resin is selected from the group consisting of polycyclohexanone resin, polyalphamethyl styrene, polyvinyl alcohol, polyisobutyl methacrylate, and polybutyl methacrylate.

22. The method of claim 16, wherein the emulsifier is selected from the group consisting of polyoxyethylene (20) sorbitol beeswax derivative, sorbitan trioleate/polyoxyethylene (20) trioleate in a 1.5:1 ratio, and sorbitan sesquioleate.

23. The method of claim 16, wherein the solvent is Stoddard solvent, the resin is polycyclohexanone resin, the emulsifier is sorbitan trioleate in a 1.5:1 ratio/polyoxyethylene (20) trioleate and the wax product comprises a mixture of beeswax and shellac wax.

24. A method of making a water in oil emulsion formulation which comprises:

(a) heating Stoddard solvent;

(b) adding polycyclohexanone resin to the heated solvent;

(c) melting the combination of step (b);

(d) combining and melting beeswax and shellac wax;

(e) combining the solvent/resin mixture of step (c) with the wax combination of step (d);

(f) adding sorbitan trioleate and polyoxyethylene (20) trioleate derivative to the mixture of step (e); and (g) adding deionized water while agitating the mixture of step (f).

25. A method of polishing a surface comprising applying the formulation of claim 1, 9 or 10 to a surface which is not sensitive to the solvent and buffing the surface.

26. The method of claim 25, wherein the surface is selected from the group consisting of a painted surface, wood, varnished surface, stone, ceramic, metal, and plastic.

* * * * *